(12) United States Patent
Sung et al.

(10) Patent No.: US 9,983,457 B2
(45) Date of Patent: May 29, 2018

(54) COMPLEX SPATIAL LIGHT MODULATOR AND HOLOGRAPHIC 3D IMAGE DISPLAY DEVICE HAVING THE SAME

(71) Applicant: SAMSUNG ELECTRONICS CO., LTD., Suwon-si (KR)

(72) Inventors: Gee-young Sung, Yongin-si (KR); Hoon Song, Yongin-si (KR); Kang-hee Won, Yongin-si (KR); Kyu-hwan Choi, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1277 days.

(21) Appl. No.: 13/725,099

(22) Filed: Dec. 21, 2012

(65) Prior Publication Data
US 2013/0321888 A1   Dec. 5, 2013

(30) Foreign Application Priority Data

Jun. 1, 2012 (KR) .................. 10-2012-0059431

(51) Int. Cl.
*G03H 1/12*       (2006.01)
*G02F 1/19*       (2006.01)
(Continued)

(52) U.S. Cl.
CPC .............. *G02F 1/19* (2013.01); *G02F 1/0136* (2013.01); *G03H 1/02* (2013.01); *G03H 1/2286* (2013.01);
(Continued)

(58) Field of Classification Search
CPC . G02F 1/19; G02F 1/0136; G02F 1/01; G02F 1/133504; G02F 1/1335;
(Continued)

(56) References Cited

U.S. PATENT DOCUMENTS 6,018,402 A    1/2000  Campbell et al.
7,357,510 B2 *  4/2008  Kim .................... G02B 27/2235
                                                     348/57
(Continued)

FOREIGN PATENT DOCUMENTS

EP   0807832 A2 * 11/1997   ............. G02B 5/045
EP   1197766 A2 *  4/2002   ........... G02B 5/3083
(Continued)

OTHER PUBLICATIONS

Liu, et al., "Complex Fresnel hologram display using a single SLM", Applied Optics, vol. 50, Issue No. 34, Dec. 1, 2011, pp. H128-H135.

*Primary Examiner* — Stephone B Allen
*Assistant Examiner* — Jyotsna Dabbi
(74) *Attorney, Agent, or Firm* — Sughrue Mion, PLLC

(57) ABSTRACT

A complex spatial light modulator includes a polarization-phase modulator for separating an incident beam into a first beam having a first polarization and a first phase, and a second beam having a second polarization and a second phase, and for outputting the first beam and the second beam; and a beam synthesizer including a prism structure formed of an optical anisotropic material having a first refractive index with respect to the first beam having the first polarization and having a second refractive index, different form the first refractive index, with respect to the second beam having the second polarization, where the beam synthesizer combines the first beam and the second beam.

12 Claims, 8 Drawing Sheets

(51) Int. Cl.
*G02F 1/01* (2006.01)
*G03H 1/22* (2006.01)
*G03H 1/02* (2006.01)
*G02F 1/13363* (2006.01)
*G03H 1/08* (2006.01)

(52) U.S. Cl.
CPC ............... *G03H 1/2294* (2013.01); *G02F 2001/133631* (2013.01); *G03H 2001/0224* (2013.01); *G03H 2001/0858* (2013.01); *G03H 2222/31* (2013.01); *G03H 2223/18* (2013.01); *G03H 2223/19* (2013.01); *G03H 2225/33* (2013.01); *G03H 2225/55* (2013.01)

(58) Field of Classification Search
CPC . G02F 2001/133631; G02F 2001/0858; G02F 2001/0224; G03H 2222/31; G03H 2223/18; G03H 2223/19; G03H 2225/33; G03H 2225/55; G03H 1/2286; G03H 1/2294; G03H 1/02; G03H 1/22; G03H 1/2205; G02B 5/30; G02B 5/32; G02B 5/045; G02B 5/1814; G02B 5/04; G02B 5/18; G02B 27/2214; G02B 27/22; G02B 26/00
USPC ..... 359/11, 256, 463, 575, 569, 625; 349/15
See application file for complete search history.

(56) References Cited

U.S. PATENT DOCUMENTS

| | | |
|---|---|---|
| 7,791,560 B2 | 9/2010 | Smith et al. |
| 7,986,603 B1 | 7/2011 | Trisnadi et al. |
| 2012/0092735 A1* | 4/2012 | Futterer ............... G02B 5/32 359/11 |
| 2013/0335795 A1 | 12/2013 | Song et al. |

FOREIGN PATENT DOCUMENTS

| | | |
|---|---|---|
| JP | 05119296 A | 5/1993 |
| JP | 2009223939 A | 10/2009 |
| JP | 2011154039 A | 8/2011 |

\* cited by examiner

COMPLEX SPATIAL LIGHT MODULATOR AND HOLOGRAPHIC 3D IMAGE DISPLAY DEVICE HAVING THE SAME

CROSS-REFERENCE TO RELATED APPLICATION

This application claims priority from Korean Patent Application No. 10-2012-0059431, filed on Jun. 1, 2012, in the Korean Intellectual Property Office, the disclosure of which is incorporated herein in its entirety by reference.

BACKGROUND

1. Field

Apparatuses and methods consistent with exemplary embodiments relate to a complex spatial light modulator capable of modulating a phase and amplitude of light, and a holographic three-dimensional (3D) image display device having the complex spatial light modulator.

2. Description of the Related Art

Light modulation technology for modulating a phase or amplitude of light is used in various optical fields including an optical examination device, a display device, and the like.

Recently, according to an increasing demand for a three-dimensional (3D) image display device, research is being conducted for a spatial light modulator to be employed in a holographic 3D image display device.

A holographic 3D image display device may display a more natural stereoscopic image, compared to a binocular parallax-type 3D image display device. In order to embody the holographic 3D image display device, a spatial light modulator is required to simultaneously control a phase and amplitude of light. When an image is displayed by using a device that controls only one of the phase and amplitude of light, an image quality may deteriorate due to a zeroth diffraction beam, a twin-image, speckle, or the like.

SUMMARY

One or more exemplary embodiments provide a complex spatial light modulator capable of simultaneously modulating a phase and amplitude of light.

Additional exemplary aspects will be set forth in part in the description which follows and, in part, will be apparent from the description, or may be learned by practice of the presented embodiments.

According to an aspect of an exemplary embodiment, a complex spatial light modulator includes a polarization-phase modulator which separates an incident beam into to a first beam having first polarization and a first phase, and a second beam having second polarization and a second phase, and for outputting the first beam and the second beam; and a beam synthesizer including a prism structure formed of an optical anisotropic material having a first refractive index with respect to the first beam having the first polarization and having a second refractive index with respect to the second beam having the second polarization, and for combining the first beam and the second beam.

The incident beam that is incident on the polarization-phase modulator may be a beam having first polarization.

The complex spatial light modulator may further include a first polarizer for transforming polarization of a beam incident thereon into the beam having the first polarization.

The polarization-phase modulator may include a phase-type spatial light modulator comprising a first cell that modulates a phase of a portion of the incident beam incident thereon and outputs a beam having the first phase and a second cell that modulates a phase of a portion of the incident beam incident thereon and outputs a beam having the second phase; and a pattern rotator comprising a first region that corresponds to the first cell and a second region that correspond to the second cell, wherein one of the first region and the second region is a rotator that rotates a polarization of a beam incident thereon having the first polarization and outputs a beam with the second polarization.

The beam synthesizer may include a first prism sheet comprising at least one prism that has a light-incident surface which is normal to an optical axis of the incident beam, and a first inclined surface which is inclined with respect to the light-incident surface; and a second prism sheet that is spaced apart from the first prism sheet, and that comprises at least one prism having a light-exit surface which is parallel with the light-incident surface, and a second inclined surface which faces the first inclined surface and which is inclined with respect to the light-incident surface.

The first prism sheet and the second prism sheet may be formed of an optical anisotropic material with a first refractive index with respect to the first beam having the first polarization that is substantially the same as a refractive index of air, and with a second refractive index with respect to the second beam having the second polarization that is greater than 1.

An angle by which the first inclined surface and the second inclined surface are inclined with respect to the light-incident surface may be set such that an optical path of the second beam is changed due to refraction at the first inclined surface and refraction the second inclined surface, and thus the optical path of the second beam is changed by the beam synthesizer to be the same as the optical path of the first beam that passes through the first inclined surface and the second inclined surface without refraction.

The beam synthesizer may include a prism that has a first inclined surface having a normal inclined with respect to an optical axis of the incident beam, and a second inclined surface which is parallel with the first inclined surface and which faces the first inclined surface.

The prism structure may be formed of an optical anisotropic material with a first refractive index with respect to the first beam having the first polarization that is substantially the same as a refractive index of air, and with a second refractive index with respect to the second beam having the second polarization that is greater than 1.

An angle by which the normal of the first inclined surface is inclined with respect to an optical axis of the incident beam may be such that an optical path of the second beam is changed due to refraction at the first inclined surface and refraction at the second inclined surface, and thus the optical path of the second beam is changed by the beam synthesizer to be the same as an optical path of the first beam that passes through the first inclined surface and the second inclined surface without refraction.

The beam synthesizer may include a first prism sheet comprising at least one prism that has a light-incident surface which is normal to an optical axis of the incident beam, and a first inclined surface which is inclined with respect to the light-incident surface; a second prism sheet that is spaced apart from the first prism sheet, and that comprises at least one prism having a second inclined surface which faces the first inclined surface and which is inclined with respect to the light-incident surface, and a light-exit surface which is parallel to the light-incident surface; and a prism structure which fills a region between the first prism sheet and the second prism sheet.

The first prism sheet and the second prism sheet may be formed of an optical isotropic material, and their refractive indexes may be substantially equal to each other.

The prism structure may be formed of an optical anisotropic material with a refractive index with respect to the first beam having the first polarization that is substantially the same as a refractive index of the first prism sheet, and with a refractive index with respect to the second beam having the second polarization that is different from the refractive index of the first prism sheet.

An angle by which the first inclined surface and the second inclined surface are inclined with respect to the light-incident surface may be such that an optical path of the second beam is changed due to refraction at the first inclined surface and refraction at the second inclined surface, and thus the optical path of the second beam is changed by the beam synthesizer to be the same as an optical path of the first beam that passes through the first inclined surface and the second inclined surface without refraction.

The prism structure may be formed of an optical isotropic material, and wherein the first prism sheet and the second prism sheet are formed of an optical anisotropic material with a refractive index with respect to the first beam having the first polarization that is substantially the same as a refractive index of the prism structure, and with a refractive index with respect to the second beam having the second polarization that is different from the refractive index of the prism structure.

An angle by which the first inclined surface and the second inclined surface are inclined with respect to the light-incident surface may be such that an optical path of the second beam is changed due to refraction at the first inclined surface and refraction at the second inclined surface, and thus the optical path of the second beam is changed by the beam synthesizer to be the same as an optical path of the first beam that passes through the first inclined surface and the second inclined surface without refraction.

The beam synthesizer may include a first prism that has a light-incident surface which is normal to an optical axis of the incident beam, and a first inclined surface inclined with respect to the light-incident surface; a second prism that has a second inclined surface inclined with respect to the light-incident surface, and a light-exit surface in parallel with the light-incident surface, that is spaced apart from the first prism along a direction of the optical axis, and is offset from the first prism by a width of the second region in a direction perpendicular to the optical axis; and a prism structure which fills a region between the first prism and the second prism.

The prism structure may be formed of an optical isotropic material, and the first prism and the second prism may be formed of an optical anisotropic material with a refractive index with respect to the first beam having the first polarization that is substantially the same as a refractive index of the prism structure, and with a refractive index with respect to the second beam having the second polarization that is different from the refractive index of the prism structure.

An angle by which the first inclined surface and the second inclined surface are inclined with respect to the light-incident surface may be such that an optical path of the second beam is changed due to refraction at the first inclined surface and refraction at the second inclined surface, and thus the optical path of the second beam is changed by the beam synthesizer to be the same as an optical path of the first beam that passes through the first inclined surface and the second inclined surface without refraction.

The complex spatial light modulator may further include a second polarizer which transforms polarization of a synthesized beam of the first beam and the second beam, which is synthesized while passing through the beam synthesizer, into third polarization that is inclined by 45 degrees with respect to the first polarization and the second polarization, or a fourth polarization which is perpendicular to the third polarization.

According to an aspect of another exemplary embodiment, a holographic three-dimensional (3D) image display device includes a light source unit; the complex spatial light modulator; and a control unit for controlling the complex spatial light modulator to modulate a beam incident thereon according to 3D image information.

The light source unit may irradiate a beam that is polarized in a first polarization direction.

The holographic 3D image display device may further include an imaging optical unit that includes one or more lenses to magnify or to reduce an image formed by the complex spatial light modulator.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
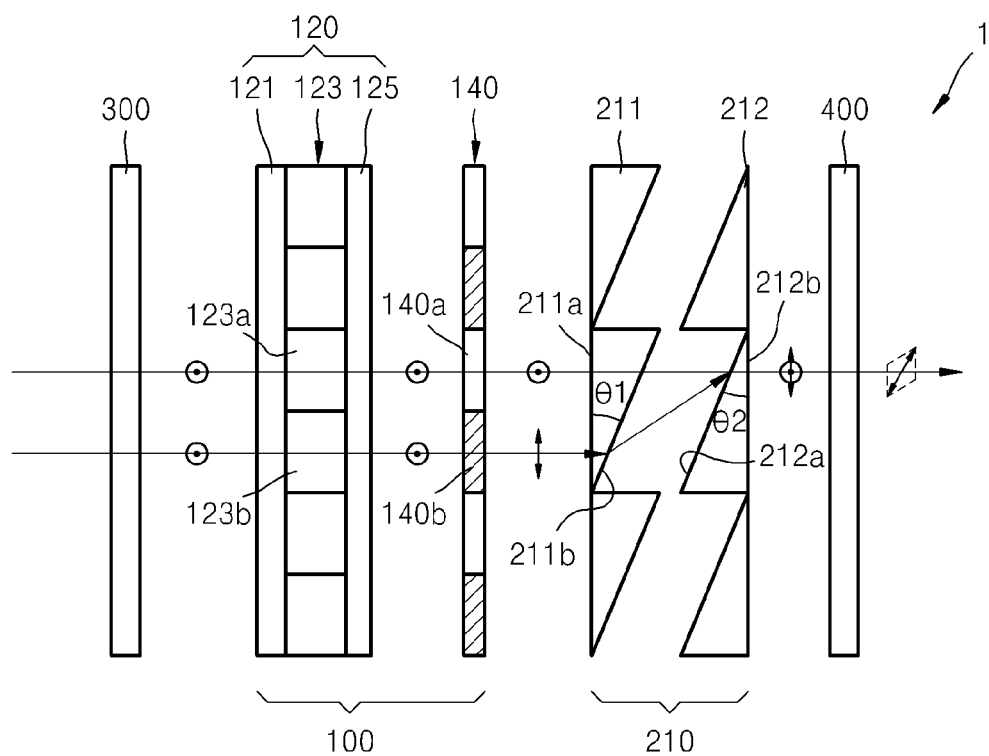
FIG. 1 illustrates a structure of a complex spatial light modulator according to an exemplary embodiment.

Reference will now be made in detail to exemplary embodiments which are illustrated in the accompanying drawings. In the drawings, like reference numerals in the drawings denote like elements, and the size of each component may be exaggerated for clarity.

FIG. 1 illustrates a structure of a complex spatial light modulator 1 according to an exemplary embodiment. Referring to FIG. 1, the complex spatial light modulator 1 includes a polarization-phase modulator 100 and a beam synthesizer 210. Also, the complex spatial light modulator 1 may further include a first polarizer 300 for transforming polarization of a beam that is incident on the polarization-phase modulator 100, and a second polarizer 400 for transforming polarization of a beam that is synthesized while passing through the beam synthesizer 210.

The polarization-phase modulator 100 modulates an incident beam for the incident beam to have a predetermined polarization and a predetermined phase. For example, the polarization-phase modulator 100 modifies the incident beam into a first beam having first polarization and a first phase, and a second beam having second polarization and a second phase, according to positions of the first and second beam, and then outputs the first beam and the second beam. The first polarization and the second polarization may be linear polarizations in an X-axis direction and a Y-axis direction, respectively. As illustrated in FIG. 1, a beam that is incident on the polarization-phase modulator 100 may be polarized to the first polarization by the first polarizer 300.

The polarization-phase modulator 100 may include a phase-type spatial light modulator 120 and a pattern rotator 140. The phase-type spatial light modulator 120 includes two cells 123a and 123b that modify the phase of the incident beam to the first phase and the second phase, respectively. The two cells 123a and 123b may repeatedly alternate within the phase-type spatial light modulator 120. As illustrated in FIG. 1, the phase-type spatial light modulator 120 may have a structure in which a photoelectric material layer 123 is arranged between two substrates 121 and 125. A refractive index of the photoelectric material layer 123 may be changed by an electrical signal, so that the photoelectric material layer 123 may change a phase of light output therefrom. Regions of the photoelectric material layer 123 may be partitioned into a plurality of the two cells 123a and 123b, and the electrical signal may be differently controlled in the two cells 123a and 123b, so that the first and second beams may exit with different phases depending on which of the two cells the beams passed through. The photoelectric material layer 123 may be formed of the plurality of regions in which the two cells 123a and 123b are repeated.

The pattern rotator 140 has a first region 140a and a second region 140b that correspond to the two cells 123a and 123b, respectively. A plurality of the first and second regions 140a and 140b may repeatedly alternate within the pattern rotator 140. One of the first region 140a and the second region 140b is a rotator that rotates polarization of light incident thereon having the first polarization to be the second polarization. The first region 140a does not change polarization and may be formed of a transparent material such as a glass material. As illustrated in FIG. 1, the pattern rotator 140 may have a structure in which the first region 140a and the second region 140b are alternately repeated.

The beam synthesizer 210 includes a prism structure that is formed of an optical anisotropic material having a refractive index with respect to the first beam having the first polarization that is different than its refractive index for the second beam having the second polarization. Thus, the beam synthesizer 210 functions to synthesize the first beam and the second beam that are emitted from the polarization-phase modulator 100. The first beam passes through the cell 123a of the phase-type spatial light modulator 120 and the first region 140a of the pattern rotator 140, and then is incident on the beam synthesizer 210, and the second beam passes through the cell 123b of the phase-type spatial light modulator 120 and the second region 140b of the pattern rotator 140, and then is incident on the beam synthesizer 210. The first and second beams, which are incident on the beam synthesizer 210 after passing through locations that are spatially different from each other, pass through the beam synthesizer 210 and are thereby synthesized to travel along the same optical path.

The beam synthesizer 210 includes a first prism sheet 211 and a second prism sheet 212 that are separated from each other. On the first prism sheet 211, at least one prism pattern is formed including a prism that has a light-incident surface 211a which is normal to with an optical axis of the incident beam, and a first inclined surface 211b forming a predetermined angle θ1 with respect to the light-incident surface 211a. A plurality of the prisms may be continuously and repeatedly formed in an array. Also, on the second prism sheet 212, at least one prism pattern is formed including a prism that has a light-exit surface 212b in parallel with the light-incident surface 211a, and a second inclined surface 212a forming a predetermined angle θ2 with respect to the light-exit surface 212b. A plurality of the prisms may be continuously and repeatedly formed in an array.

The first prism sheet 211 and the second prism sheet 212 may be formed of an optical anisotropic material with a refractive index with respect to the first beam having the first polarization that is substantially the same as a refractive index of air, and with a refractive index with respect to the second beam having the second polarization that is greater than 1.

Due to the aforementioned structure of the beam synthesizer 210, the first beam having the first polarization passes through the first inclined surface 211b and the second inclined surface 212a without refraction, so that an optical path of the first beam is not changed after passing through the beam synthesizer 210. However, an optical path of the second beam having the second polarization is changed due to refraction at the first inclined surface 211b and the second inclined surface 212a, so that the optical path of the second beam becomes the same as the optical path of the first beam after the second beam passes through the beam synthesizer 210. The angle θ1 and the angle θ2 by which the first inclined surface 211b and the second inclined surface 212a are inclined with respect to the light-incident surface 211a may be appropriately set to match the optical path of the first beam with the optical path of the second beam after the first and second beams pass through the beam synthesizer 210.

The first prism sheet 211 and the second prism sheet 212 may be formed of materials having the same optical anisotropic characteristics. In this case, the angles θ1 and θ2 by which the first inclined surface 211b and the second inclined surface 212a are inclined with respect to the light-incident surface 211a may be equal to each other. That is, the first inclined surface 211b and the second inclined surface 212a may be parallel with each other. Also, the first prism sheet 211 and the second prism sheet 212 may be formed of materials having different optical anisotropic characteristics, for example, refractive indexes of the first prism sheet 211 and the second prism sheet 212 with respect to the second beam having the second polarization may be different from each other. In this case, in order to allow the first beam and the second beam to be synthesized to have the same optical path, the angles θ1 and θ2 by which the first inclined surface 211b and the second inclined surface 212a are inclined with respect to the light-incident surface 211a may be differently set.

The simultaneous modulation of a phase and amplitude of the incident beam, which is performed by the complex spatial light modulator 1 having the aforementioned structure, may be confirmed via Equation 1 below.

$$\frac{1}{2}\exp[i\phi_1(x, y)] + \frac{1}{2}\exp[i\phi_2(x, y)] = \cos\left(\frac{\phi_1 - \phi_2}{2}\right)\exp\left[i\left(\frac{\phi_1 + \phi_2}{2}\right)\right]$$

Equation 1

That is, the first beam having the first polarization and the second beam having the second polarization have phase, $\varphi_1$ and phase, $\varphi_2$, respectively, after passing through the polarization-phase modulator 100, and are synthesized to travel along the same optical path after passing through the beam synthesizer 210. An amplitude and a phase of a synthesized beam satisfy Equation 1 above. That is, the amplitude is modulated to have a value of $\cos((\varphi_1-\varphi_2)/2)$, and the phase is modulated to have a value of $(\varphi_1+\varphi_2)/2$.

After the first and second beams pass through the beam synthesizer 210, the first polarization of the first beam and the second polarization of the second beam are synthesized. To calculate the synthesized beam components, vector sum is performed with respect to the same vector component of the synthesized beam. The synthesized beam of the first beam having the first polarization and the second beam having the second polarization has a third polarization component having an angle of 45 degrees in each of a first polarization direction and a second polarization direction, and a fourth polarization component perpendicular to the third polarization component. Equation 1 above indicates the third polarization component of the synthesized beam, and the fourth polarization component of the synthesized beam may be confirmed via Equation 2 below.

$$\frac{1}{2}\exp[i\phi_1(x,y)] - \frac{1}{2}\exp[i\phi_2(x,y)] = \sin\left(\frac{\phi_1+\phi_2}{2}\right)\exp\left[i\left(\frac{\phi_1-\phi_2+\pi}{2}\right)\right]$$

Equation 2

That is, the amplitude is modulated to a have a value of $\sin((\varphi_1+\varphi_2)/2)$, and the phase is modulated to have a value of $(\varphi_1-\varphi_2+\pi)/2$.

The second polarizer 400 transforms the polarization of the incident beam, which is synthesized while passing through the beam synthesizer 210, into a beam having a third polarization having an angle of 45 degrees in each of a first polarization direction and a second polarization direction, or a beam having a fourth polarization perpendicular to the third polarization. For example, the second polarizer 400 may have a polarization axis in a third polarization direction or a fourth polarization direction, and may transmit only a beam having corresponding polarization. By using the second polarizer 400, it is possible to select a phase and amplitude determined by Equation 1 or a phase and amplitude determined by Equation 2.

Figure 2:
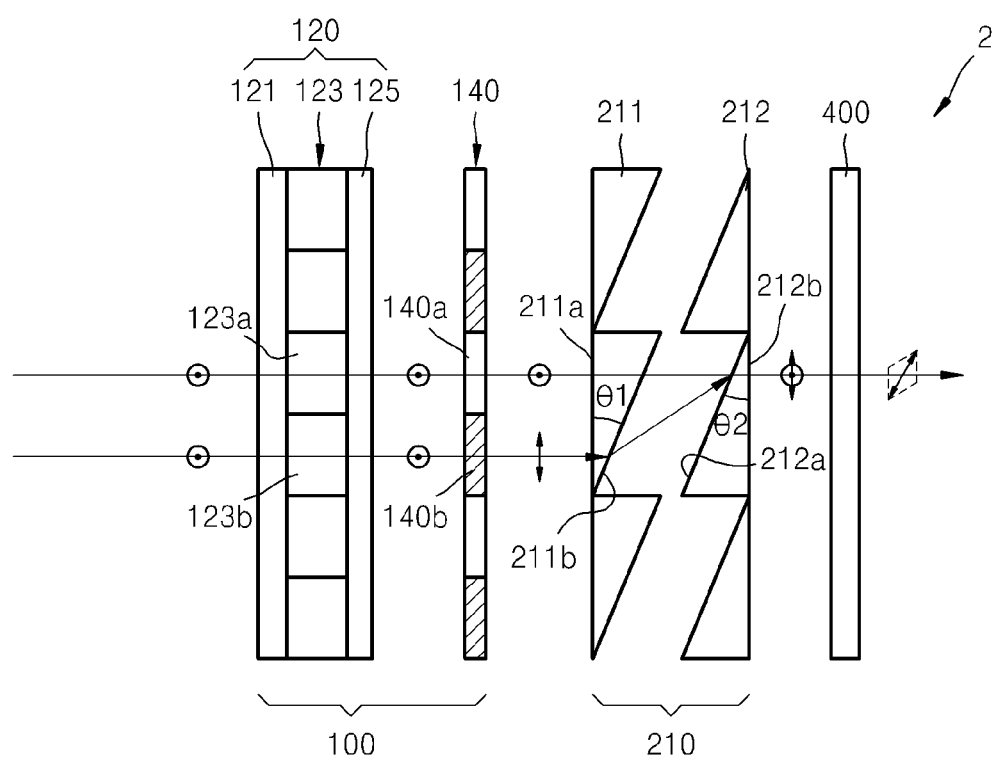
FIG. 2 illustrates a structure of a complex spatial light modulator according to another exemplary embodiment.

FIG. 2 illustrates a structure of a complex spatial light modulator 2 according to another exemplary embodiment.

The present embodiment of FIG. 2 is different from the embodiment of FIG. 1 in that the present embodiment does not include the first polarizer 300 of FIG. 1. The first polarizer 300 is an optional element, and for example, if a laser light source, or a surface light source device employing a polarization light guide plate is used, the first polarizer 300 may not be arranged.

Figure 3:
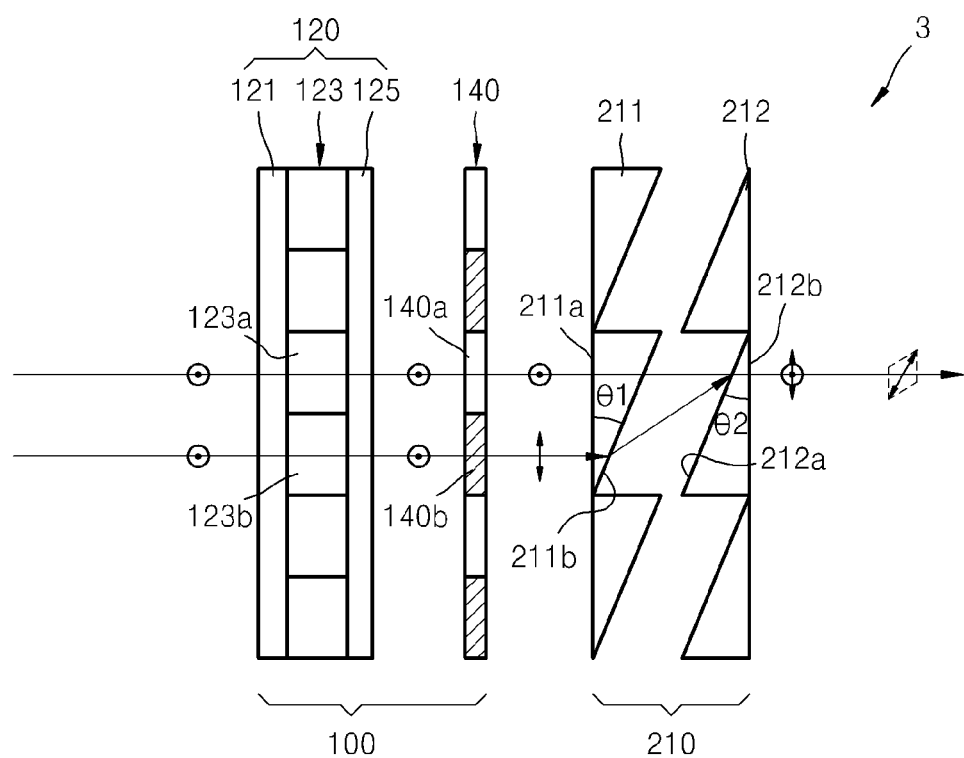
FIG. 3 illustrates a structure of a complex spatial light modulator according to another exemplary embodiment.

FIG. 3 illustrates a structure of a complex spatial light modulator 3 according to another embodiment.

The present embodiment of FIG. 3 is different from the embodiment of FIG. 1 in that the present embodiment does not include the first polarizer 300 or the second polarizer 400 of FIG. 1. That is, the second polarizer 400 arranged in the complex spatial light modulator 1 of FIG. 1 is an optional element, and for example, when in the synthesized beam that is synthesized while passing through the beam synthesizer 210, both of the two polarization components of which phases and amplitude are differently modulated are used, the second polarizer 400 may not be arranged.

Hereinafter, complex spatial light modulators according to various exemplary embodiments will be described. It is assumed that all of the complex spatial light modulators according to the various embodiments include the first polarizer 300 and the second polarizer 400. However, as described above, only one of the first polarizer 300 and the second polarizer 400 may be used or neither of them may be used. Also, because the complex spatial light modulators according to the various embodiments are different from the embodiment of FIG. 1 in the structure of the beam synthesizer, descriptions regarding the elements which are the same as those of the embodiment of FIG. 1 are omitted, and only the beam synthesizer will be described.

Figure 4:
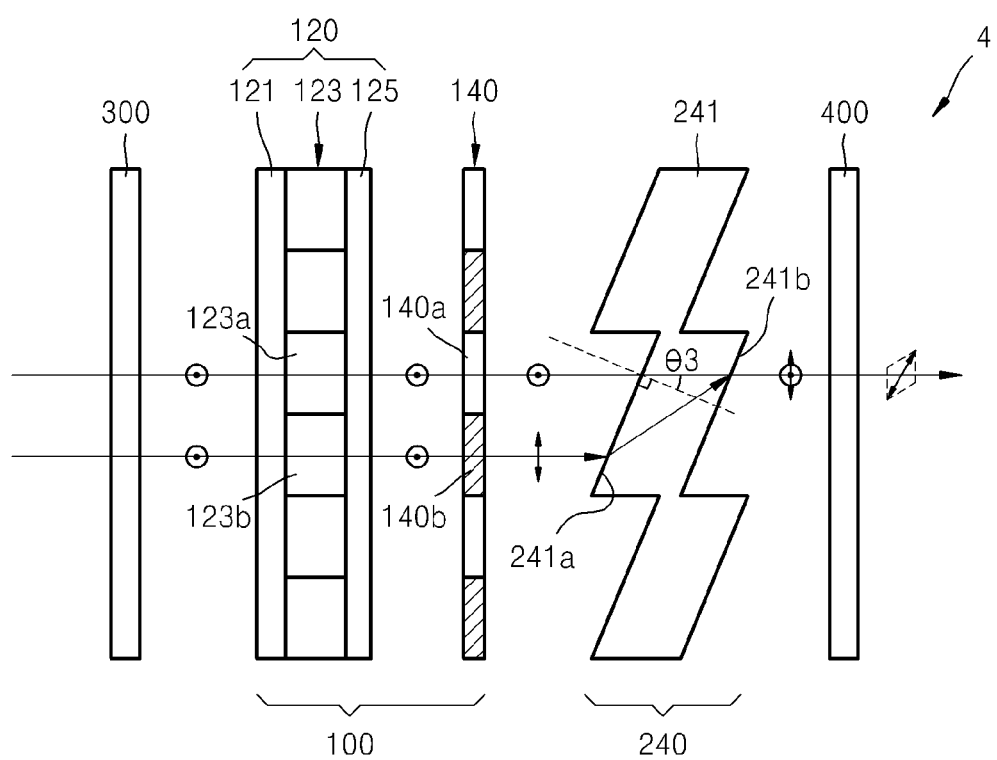
FIG. 4 illustrates a structure of a complex spatial light modulator according to another exemplary embodiment.

FIG. 4 illustrates a structure of a complex spatial light modulator 4 according to another embodiment.

A beam synthesizer 240 employed in the complex spatial light modulator 4 includes a prism structure 241 including a prism that has a first inclined surface 241*a* having a normal inclined with respect to an optical axis of an incident beam, and a second inclined surface 241*b* disposed in parallel with the first inclined surface 241*a* and facing the first inclined surface 241*a*. A plurality of the prisms may be formed in an array.

The prism structure 241 may be formed of an optical anisotropic material with a refractive index with respect to a beam having the first polarization that is substantially the same as a refractive index of air, and with a refractive index with respect to a beam having the second polarization that is greater than 1. Also, an angle θ3 by which the normal of the first inclined surface 241*a* is inclined with respect to the optical axis of the incident beam may be set in such a manner that an optical path of a second beam is changed due to refraction at the first inclined surface 241*a* and the second inclined surface 241*b*, so that the optical path of the second beam may match with an optical path of a first beam that passes through the first inclined surface 241*a* and the second inclined surface 241*b* without refraction.

Figure 5:
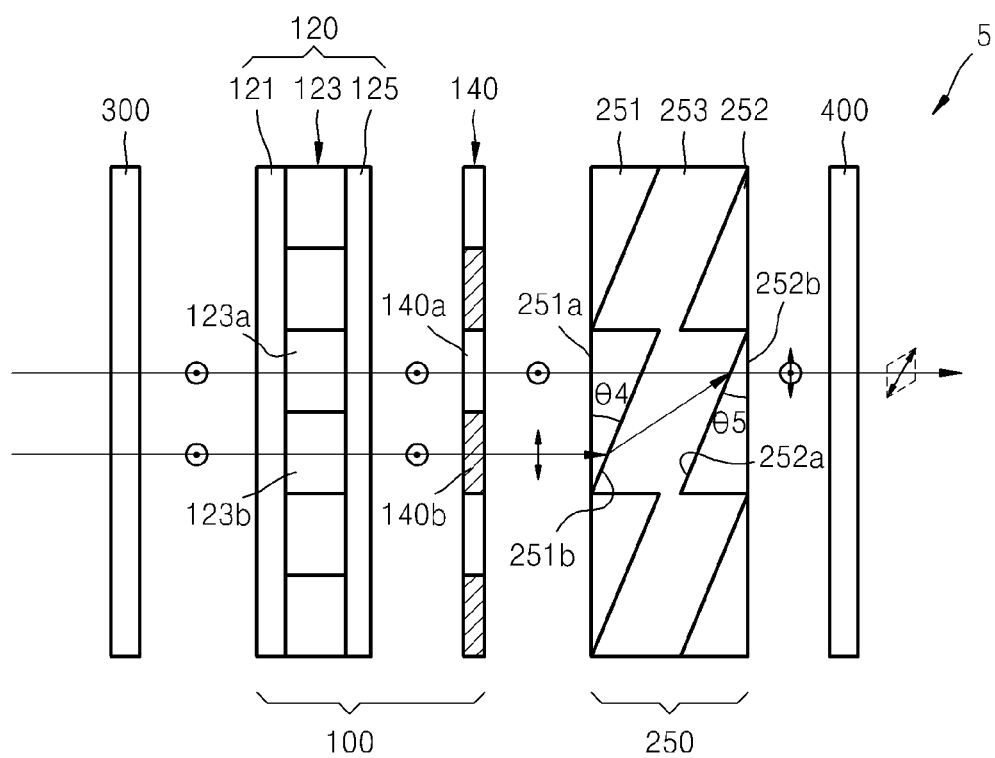
FIG. 5 illustrates a structure of a complex spatial light modulator according to another exemplary embodiment.

FIG. 5 illustrates a structure of a complex spatial light modulator 5 according to another exemplary embodiment.

A beam synthesizer 250 includes a first prism sheet 251, a second prism sheet 252, and a prism structure 253. On the first prism sheet 251, a prism pattern includes at least one prism that has a light-incident surface 251*a* having a normal in parallel with an optical axis of an incident beam, and a first inclined surface 251*b* inclined with respect to the light-incident surface 251*a*. As illustrated in FIG. 5, a plurality of the prisms may be provided in an array. The second prism sheet 252 is spaced apart from the first prism sheet 251, and includes a prism pattern having at least one prism that has a second inclined surface 252*a* that faces the first inclined surface 251*b* and that is inclined with respect to the light-incident surface 251*a*, and a light-exit surface 252*b* that is in parallel with the light-incident surface 251*a*. As illustrated in FIG. 5, a plurality of the prisms may be provided in an array.

The first prism sheet 251 and the second prism sheet 252 may be formed of an optical isotropic material, and their refractive indexes may be substantially the same.

The prism structure 253 has a shape that fills a region between the first prism sheet 251 and the second prism sheet 252. The prism structure 253 may be formed of an optical anisotropic material with a refractive index with respect to a first beam having first polarization that is substantially the same as a refractive index of the first prism sheet 251, and with a refractive index with respect to a second beam having second polarization that is different from the refractive index of the first prism sheet 251.

Angles θ4 and θ5 by which the first inclined surface 251b and the second inclined surface 252a are inclined with respect to the light-incident surface 251a, respectively, may be set in such a manner that an optical path of the second beam is changed due to refraction at the first inclined surface 251b and the second inclined surface 252a, so that the optical path of the second beam may match with an optical path of the first beam that passes through the first inclined surface 251b and the second inclined surface 252a without refraction. The first inclined surface 251b and the second inclined surface 252a may be parallel with each other.

Figure 6:
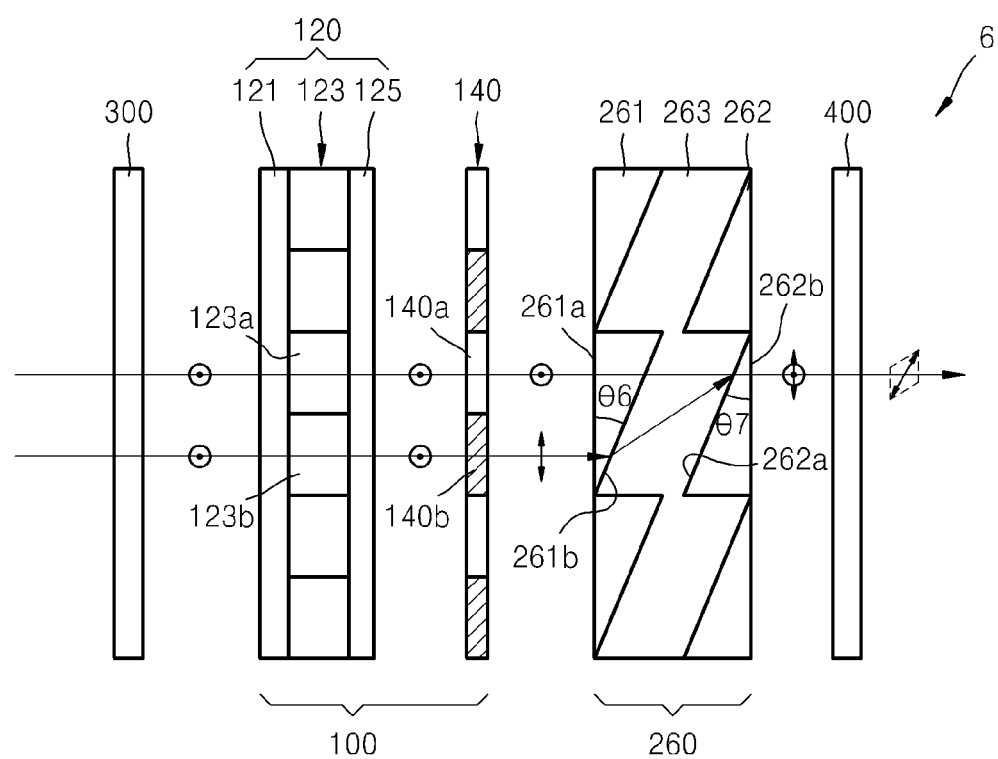
FIG. 6 illustrates a structure of a complex spatial light modulator according to another exemplary embodiment.

FIG. 6 illustrates a structure of a complex spatial light modulator 6 according to another embodiment.

A beam synthesizer 260 includes a first prism sheet 261, a second prism sheet 262, and a prism structure 263. On the first prism sheet 261, a prism pattern includes at least one prism that has a light-incident surface 261a having a normal in parallel with an optical axis of an incident beam, and a first inclined surface 261b inclined with respect to the light-incident surface 261a. As illustrated in FIG. 6, a plurality of the prisms may be provided in an array. The second prism sheet 262 is spaced apart from the first prism sheet 261, and includes a prism pattern having at least one prism that has a second inclined surface 262a that is separated from the first inclined surface 261b and that is inclined with respect to the light-incident surface 261a, and a light-exit surface 262b that is in parallel with the light-incident surface 261a. As illustrated in FIG. 6, a plurality of the prisms may be provided in an array.

The prism structure 263 may have a shape that fills a region between the first prism sheet 261 and the second prism sheet 262, and may be formed of an optical isotropic material. The first prism sheet 261 and the second prism sheet 262 may be formed of the optical anisotropic material with a refractive index with respect to a first beam having first polarization that is substantially the same as a refractive index of the prism structure 263, and with a refractive index with respect to a second beam having second polarization that is different from the refractive index of the prism structure 263.

Angles θ6 and θ7 by which the first inclined surface 261b and the second inclined surface 262a are inclined with respect to the light-incident surface 261a, respectively, may be set in such a manner that an optical path of the second beam is changed due to refraction at the first inclined surface 261b and the second inclined surface 262a, so that the optical path of the second beam may match with an optical path of the first beam that passes through the first inclined surface 261b and the second inclined surface 262a without refraction.

When the refractive index of the first prism sheet 261 with respect to the second polarization is equal to the refractive index of the second prism sheet 262 with respect to the second polarization, the first inclined surface 261b and the second inclined surface 262a may be parallel with each other. When the refractive index of the first prism sheet 261 with respect to the second polarization is different from the refractive index of the second prism sheet 262 with respect to the second polarization, the first inclined surface 261b and the second inclined surface 262a may be inclined by different angles.

Figure 7:
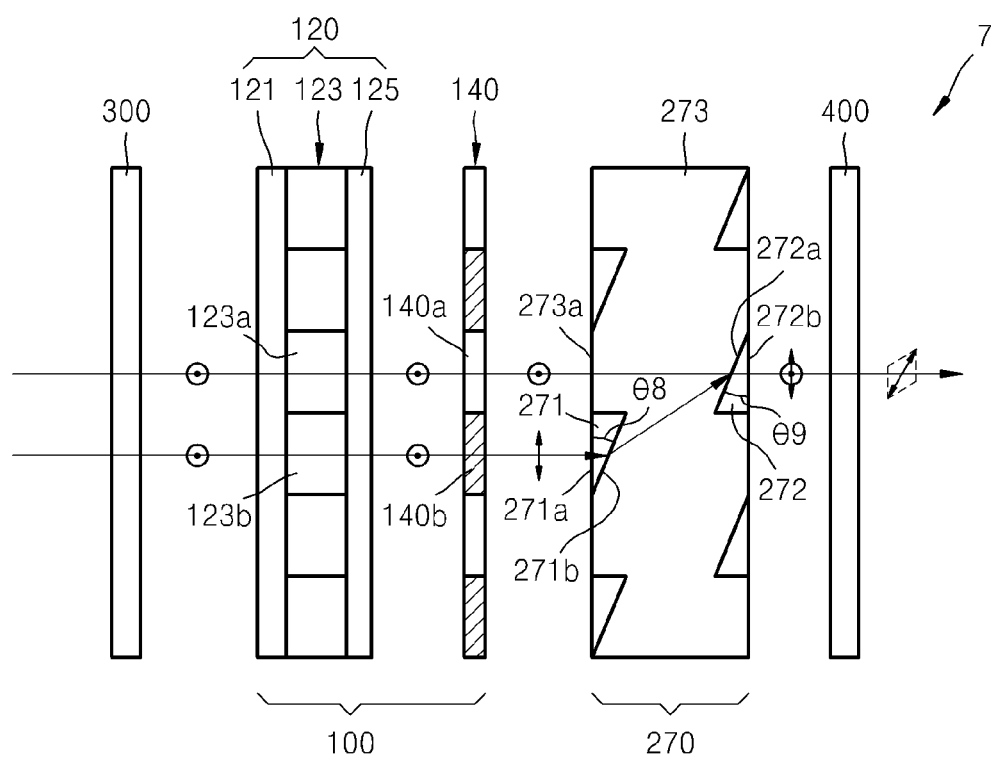
FIG. 7 illustrates a structure of a complex spatial light modulator according to another exemplary embodiment.

FIG. 7 illustrates a structure of a complex spatial light modulator 7 according to another embodiment.

A beam synthesizer 270 includes at least a first prism 271, a second prism 272, and a prism structure 273.

The first prism 271 has a light-incident surface 271a which is normal to an optical axis of an incident beam, and a first inclined surface 271b inclined with respect to the light-incident surface 271a. As illustrated in FIG. 7, a plurality of the first prisms 271 may be provided in an array with predetermined intervals therebetween along a direction that is perpendicular to the optical axis. In the array, the first prisms may be disposed at positions that correspond to second regions 140b of a pattern rotator 140.

The second prism 272 has a second inclined surface 272a that is inclined with respect to the light-incident surface 271a, and a light-exit surface 272b that is in parallel with the light-incident surface 271a. The second prism 272 may be spaced apart from the first prism 271 along a direction of the optical axis, and a plurality of the second prisms 272 may be provided in an array, such that the second prisms are disposed at positions that correspond to first regions 140a of the pattern rotator 140, the second prisms 272 being offset from the first prisms 271 by a width of the second region 140b in a direction perpendicular to the optical axis. As illustrated in FIG. 7, a plurality of the second prisms 272 may be provided in an array with predetermined intervals therebetween along a direction that is perpendicular to the optical axis.

The prism structure 273 may be formed of an optical isotropic material. Also, the first prism 271 and the second prism 272 may be formed of an optical anisotropic material with a refractive index with respect to a first beam having first polarization that is substantially the same as a refractive index of the prism structure 273, and with a refractive index with respect to a second beam having second polarization that is different from the refractive index of the prism structure 273.

Angles θ8 and θ9 by which the first inclined surface 271b and the second inclined surface 272a are inclined with respect to the light-incident surface 271a, respectively, may be set in such a manner that an optical path of the second beam is changed due to refraction at the first inclined surface 271b and the second inclined surface 272a, so that the optical path of the second beam may match with an optical path of the first beam that passes through the first inclined surface 271b and the second inclined surface 272a without refraction.

When the refractive index of the first prism 271 with respect to the second polarization is equal to the refractive index of the second prism 272 with respect to the second polarization, the first inclined surface 271b and the second inclined surface 272a may be parallel with each other. When the refractive index of the first prism 271 with respect to the second polarization is different from the refractive index of the second prism 272 with respect to the second polarization, the first inclined surface 271b and the second inclined surface 272a may be inclined by different angles.

The complex spatial light modulators 1, 2, 3, 4, 5, 6, and 7 may simultaneously modulate an amplitude and phase of light and thus may be used in various optical fields including an optical examination device, a display device, and the like. For example, it is possible to embody a holographic 3D image display device having excellent image quality, by using one of the complex spatial light modulators 1, 2, 3, 4, 5, 6, and 7.

Figure 8:
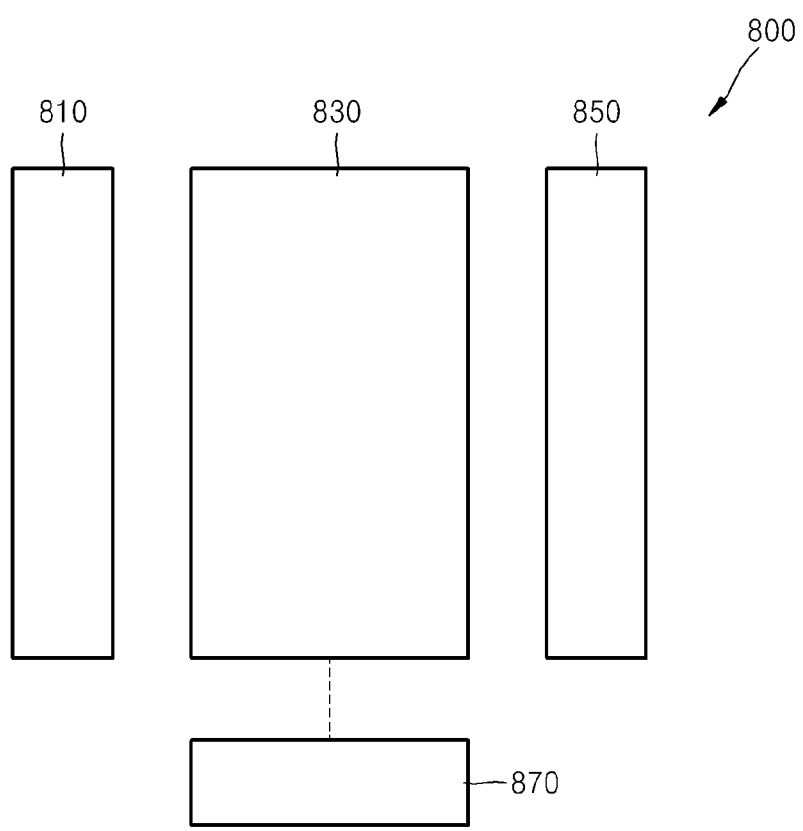
FIG. 8 illustrates a structure of a holographic three-dimensional (3D) image display device exemplary according to an embodiment.

FIG. 8 illustrates a structure of a holographic 3D image display device 800 according to an exemplary embodiment.

The holographic 3D image display device 800 includes a light source unit 810, a complex spatial light modulator 830, and a control unit 870 for controlling a beam, which is incident on the complex spatial light modulator 830, to be modulated according to 3D image information.

One of the complex spatial light modulators 1, 2, 3, 4, 5, 6, and 7 according to the embodiments may be used as the complex spatial light modulator 830.

The light source unit 810 may include a light source device for irradiating a beam that is polarized in a first polarization direction. For example, the light source unit 810 may include a laser light source and an optical system for beam shaping. Alternatively, the light source unit 810 may include a surface light source device for emitting a beam that is polarized by using a polarization light guide plate. The light source unit 810 may have a configuration for emitting a beam that is not polarized.

The control unit 870 may electrically control the complex spatial light modulator 830 in such a manner that the beam incident on the complex spatial light modulator 830 may be modulated according to the 3D image information. For example, the control unit 870 may apply an electrical signal to the complex spatial light modulator 830 so as to allow a phase of the incident beam to be differently modulated in each cell region of a phase-type spatial light modulator 120 arranged in the complex spatial light modulator 830.

Also, the holographic 3D image display device 800 may further include an imaging optical unit 850. The imaging optical unit 850 may include one or more lenses to magnify or to reduce an image formed in the complex spatial light modulator 830.

It should be understood that a complex spatial light modulator and a holographic 3D image display device having the complex spatial light modulator according to the exemplary embodiments described herein should be considered in a descriptive sense only and not for purposes of limitation. Descriptions of features or aspects within each embodiment should typically be considered as available for other similar features or aspects in other embodiments.

What is claimed is:

1. A complex spatial light modulator comprising:
   a polarization-phase modulator which modifies an incident beam of light and separates the incident beam of light into a first beam having a first polarization and a first phase, and a second beam having a second polarization and a second phase, and which outputs the first beam and the second beam; and
   a beam synthesizer comprising a prism structure formed of an optical anisotropic material, the optical anisotropic material having a first refractive index with respect to the first beam having the first polarization and a second refractive index, different from the first refractive index, with respect to the second beam having the second polarization, wherein the beam synthesizer combines the first beam and the second beam and outputs a beam;
   wherein the prism structure has a first inclined surface having a normal that is inclined with respect to an optical axis of the incident beam, and a second inclined surface that is parallel to the first inclined surface and that faces the first inclined surface, the prism structure being a single structure; and
   wherein the optical anisotropic material fills a space between the first inclined surface and the second inclined surface.

2. The complex spatial light modulator of claim 1, further comprising a first polarizer, disposed on an optical path before the polarization-phase modulator, which transforms a polarization of a beam incident thereon into a beam having the first polarization.

3. The complex spatial light modulator of claim 1, wherein the polarization-phase modulator comprises:
   a phase-type spatial light modulator comprising a first cell that modulates a phase of a portion of the incident beam incident thereon and outputs a beam having the first phase and a second cell that modulates a phase of a portion of the incident beam incident thereon and outputs a beam having the second phase; and
   a pattern rotator comprising a first region that corresponds to the first cell and a second region that correspond to the second cell, wherein one of the first region and the second region is a rotator that rotates a polarization of a beam incident thereon having the first polarization and outputs a beam with the second polarization.

4. The complex spatial light modulator of claim 1, wherein the first refractive index is substantially the same as a refractive index of air, and the second refractive index is greater than 1.

5. The complex spatial light modulator of claim 4, wherein an angle by which the normal of the first inclined surface is inclined with respect to the optical axis of the incident beam is such that an optical path of the second beam is changed due to refraction at the first inclined surface and refraction at the second inclined surface, and thus the optical path of the second beam is modified, by the beam synthesizer, to be the same as an optical path of the first beam which passes through the first inclined surface and the second inclined surface without refraction.

6. The complex spatial light modulator of claim 3, wherein the beam synthesizer further comprises:
   a first prism sheet comprising at least one prism that has a light-incident surface which is normal to the optical axis of the incident beam, and an inclined surface which abuts the first inclined surface of the prism structure and is inclined with respect to the light-incident surface of the first prism sheet; and
   a second prism sheet that is spaced apart from the first prism sheet, wherein the second prism sheet comprises at least one prism having an inclined surface which faces the inclined surface of the first prism sheet and abuts the second inclined surface of the prism structure and is inclined with respect to the light-incident surface of the first prism sheet, and a light-exit surface which is parallel to the light-incident surface of the first prism sheet;
   wherein each of the first prism sheet and the second prism sheet are formed of an optical isotropic material, and a refractive index of the first prism sheet is substantially equal to a refractive index of the second prism sheet.

7. The complex spatial light modulator of claim 6, wherein the first refractive index is substantially the same as the refractive index of the first prism sheet, and the second refractive index is different from the first refractive index.

8. The complex spatial light modulator of claim 7, wherein an angle by which the first inclined surface of the prism structure and the second inclined surface of the prism structure are inclined with respect to the light-incident surface of the first prism sheet is such that an optical path of the second beam is changed due to refraction at the first inclined surface of the prism structure and refraction at the second inclined surface of the prism structure, and thus the optical path of the second beam is modified, by the beam synthesizer, to be the same as an optical path of the first beam that passes through the first inclined surface of the prism structure and the second inclined surface of the prism structure without refraction.

9. The complex spatial light modulator of claim 2, further comprising a second polarizer, disposed on the optical path after the beam synthesizer, which transforms the combined beam into one of:
   a beam having a third polarization that is inclined by 45 degrees with respect to each of the first polarization and the second polarization, and
   a beam having a fourth polarization which is perpendicular to the third polarization.

10. A holographic three-dimensional (3D) image display device comprising:
    a light source unit;
    the complex spatial light modulator of claim 1; and
    a control unit which controls the complex spatial light modulator, to modulate a beam from the light source unit according to 3D image information.

11. The holographic 3D image display device of claim 10, wherein the light source unit outputs a beam that is polarized in the first polarization direction.

12. The holographic 3D image display device of claim 10, further comprising an imaging optical unit that comprises one or more lenses which magnify or to reduce an image formed by the complex spatial light modulator.

\* \* \* \* \*